United States Patent [19]

Hwang

[11] Patent Number: 5,007,365
[45] Date of Patent: Apr. 16, 1991

[54] AIR-LEAK INDICATOR FOR VEHICLE TIRE

[76] Inventor: Feng-Lin Hwang, No. 21, Pa Te Rd., Chi Tu District, Keelung City, Taiwan

[21] Appl. No.: 466,192

[22] Filed: Jan. 17, 1990

[51] Int. Cl.$^5$ ..................... B60C 23/04; G01L 19/12
[52] U.S. Cl. .............................. 116/34 R; 73/146.8; 116/272
[58] Field of Search ............... 116/34 R, 266, 272, 116/281, 283; 73/146.8, 744, 146.3; 137/227, 228, 229

[56] References Cited

U.S. PATENT DOCUMENTS 2,579,120  12/1951  Mercer .......................... 116/34 R

FOREIGN PATENT DOCUMENTS 722660   3/1932   France ............................ 137/227
2548755  1/1985   France ............................ 137/227
760208   10/1956  United Kingdom .............. 116/34 R
945124   12/1963  United Kingdom .............. 73/146.8

Primary Examiner—William A. Cuchlinski, Jr.
Assistant Examiner—W. Morris Worth
Attorney, Agent, or Firm—Browdy and Neimark

[57] ABSTRACT

An air-leak indicator, comprising a tubular body which includes all assembly members, is partly transparent and can be screwedly mounted to a tire's air valve; a tire value actuator projection which acts to operate and open the associated valve when tubular body is screwed to a tire valve; a visual indicator piston which has bands of green, yellow and red fluorescent colors graduated in its outer periphery and can reveal that color graduation through tubular body's transparent section in dependence upon the associated tire's internal air pressure movement; a spring or any other suitable resilient body with one end connected to the indicator piston lower end; and and end cap which covers the tubular body top and is provided with at least one breather in the center or other suitable places thereof. If screwed to each tire valve of a vehicle, it can indicate each tire's internal air pressure situation for user to make eye-inspection anytime even in night.

1 Claim, 1 Drawing Sheet

AIR-LEAK INDICATOR FOR VEHICLE TIRE

FIELD OF THE INVENTION

This invention relates to an air-leak indicator for vehicle tire, and particularly to a device which can be screwedly mounted to a vehicle tire's air valve to enable the user to visually inspect whether his tire is at proper air pressure level and handle air leak problem, if any, to prevent further abnormal tire wear and possible diasterous accident.

BACKGROUND OF THE INVENTION

Nowadays, vehicle drivers are often able to monitor visually the cooling water, gasoline and oil supply, driving and brake lights, indicators, and brake operation, and can be assured of their condition thereby. However, there is still no method of monitoring a tire's internal air pressure by immediate visual inspection, except, of course, when the tire becomes substantially deflated and, as a consequence, deformed and, possibly, damaged. It is well known that, if a vehicle has one tire which is not inflated at its correct air pressure, then the vehicle will run in an unbalanced manner, turn and corner awkwardly, experience abnormal tire and steering wear and, probably most importantly, will tend to brake unevenly and, under certain conditions, lose control, thereby jeopardising safety.

OBJECTS OF THE INVENTION

The present invention is mainly aimed to solve the above-said problem by providing an air-leak indicator which can be screwedly mounted to each air valve of a user's vehicle tires to allow visual inspection by the user anytime to each tire's internal air pressure, so that any air leak problem could be found at its earlier stage to enable timely handling to be done.

SUMMARY OF THE INVENTION

An air-leak indicator comprises a tubular body, a tire value actuator projection, a visual indicator piston, a spring, sealing rings and an end cap. The time this device screwed to a tire valve, the actuator projection will act to operate and open the valve's air stopper, thereby permitting air pressure to communicate with a chamber of variable volume defined between the visual indicator piston and the tubular body, so that the air chamber's pressure becomes equal to that of the associated tire and acts the visual indicator piston to move rearward, therefore pushing back the spring compressed behind, to be positioned just behind a marking line for tubular body's transparent section. Thus, if the associated tire leaks for some reason, the air chamber's pressure will go down to cause the spring to extend to take the visual indicator piston, whose peripherial walls have bands of different fluorescent colors, into the tubular body's transparent section through which a current air pressure situation could be understood by visual inspection.

SPECIFIC DESCRIPTION

Figure 2:
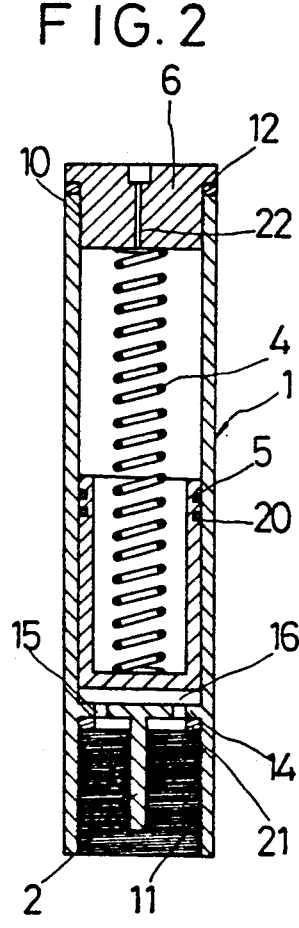
FIG. 2 is an elevational view in cross-section of the monitor shown in FIG. 1 in its ready state.
Figure 3:
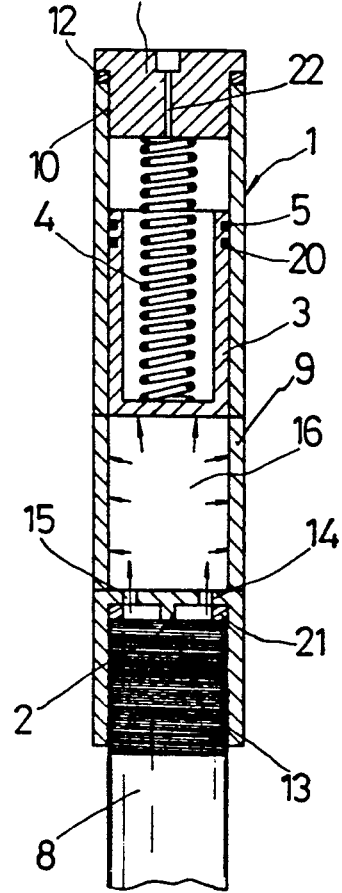
FIG. 3 is an elevational view in cross-section of the monitor shown in FIGS. 1 and 2 in an in-use state.
Figure 1:
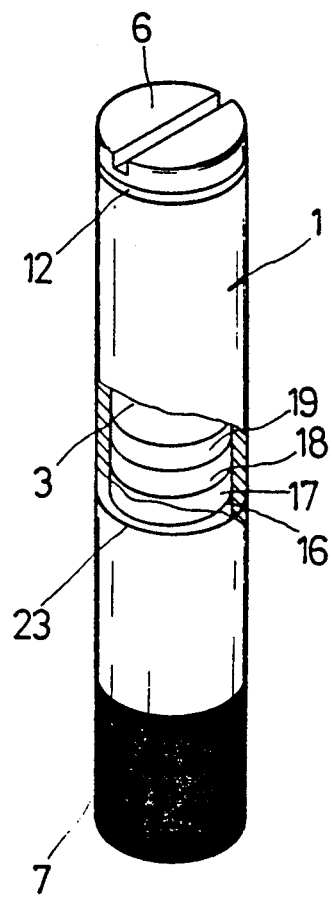
FIG. 1 is a perspective view of a tire air-leak indicator, with a partially cut-away portion in cross-section.

Referring firstly to FIGS. 1 and 2 a tire air-leak, indicator comprises a tubular body 1, a tire value actuator projection 2, a visual indicator piston 3, a spring 4, sealing rings 5 and an end cap 6. The cylindrical wall of the tubular body 1 is transparent, with a roughened, or other non-slip, outer surface 7 at a lower end portion thereof, which can be gripped by a user for applying the device to a tire valve stem 8, as shown in FIG. 3. An opaque material is coated on an outer surface at an upper end portion of the body 1, thereby leaving an intermediate portion thereof as a transparent section through which the indicator piston 3 can be viewed. Each upper and lower end portion of the tubular body 1 has an internal female thread 10, 11. The end cap 6 is threaded externally, whereby it can be screwed onto the internal female thread 10 at the upper end portion of the body 1, as shown in FIGS. 2 and 3 with a washer 12 being located between the cap 6 and the upper body end portion. The female thread 11 at the lower end portion of the body 1 can be screwed onto a corresponding male thread 13 of the tire valve stem 8. Extending over the cross-section of the tubular body 1, just above the internal female thread 11, is an integral wall 14 through which extend holes 15 for permitting the air pressure, of a tire to be monitored to communicate, via the tire valve stem 8, with a chamber 16 of variable volume defined between the wall 14 and the indicator piston 3.

The tire valve actuator projection 2 extends downwardly from the wall 14, centrally thereof and coaxially of the internal female thread 11 at the lower end portion of the body 1. This portion of the body is also provided with an internal washer 21 to ensure that this device is applied to the associated tire valve stem 8 in an airtight manner. Thus, as the monitor is so-applied to the valve stem 8, with the internal female thread 11 being screwed onto the corresponding male thread 13 of the valve stem 8, the projection 2 acts to operate and open the tire valve, thereby permitting air pressure to communicate with the chamber 16 in the body 1, via the tire valve stem 8 and the holes 15 in the wall 14. The indicator piston 3 is generally tubular with a closed bottom and open top, such that the bias spring 4 can act between that bottom and the underside of the end cap 6. The outer diameter of the tubular indicator piston 3 corresponds with the inner diameter of the tubular body 1 of the device, with the pair of sealing rings 5 being located in respective annular grooves 20 in the upper end wall of the piston. This arrangement permits the air pressure of the tire to monitored to equalize in the chamber 16, in dependence upon the extent of the resulting upward movement of the piston 3 and the compression coefficient or constant of the spring 4. The end cap 6 is provided with a breather 22 extending along the axis thereof, to allow air above the tubular indicator piston 3 in the body 1 to escape therefrom as the piston is urged slidably upwardly during the monitoring process. Similarly, air can return via the breather 22 into the space above the piston 3 upon downward movement thereof under the bias of the spring 4. In this way, the spring 4 can act normally in accordance with Hook's law. The fluorescent colored graduation bands 17 to 19, which are located on the outer periphery of the piston 3 at the lower end region thereof, are constituted by a fluorescent green band 17 representing a pressure or pressure range of normal status for the tire, a fluorescent yellow band 18 representing a warning of a low pressure or pressure range for the tire and a fluorescent red band 19 representing a very lower pressure or pressure range for the tire as a potential danger situation calling for immediate remedy.

Thus, in use of the device when applied to the valve stem 8 of a vehicle tire (not shown) with the tire valve actuator projection 2 having opened the valve, air pressure communicates from the tire into the chamber 16 beneath the indicator piston 3 via the valve, valve stem and the holes 15 in the wall 14. If the associated tire is at correct air pressure, indicator piston 3 in tubular body 1 will take a position to stand behind marking line 23 of its transparent section 9 and indicate nothing for attention. However, if an air leak happens and the air pressure of air chamber 16 comes down accordingly, spring 4 will extend therefore moving indicator piston 3 past the marking line 23 into the transparent section 9, whereby the graduation of different fluorescent colors will show in dependance upon the air leak extent to enable the user to know from eye inspection his tire air leak extent. So whatever necessary handling could be timely done to prevent from accidents.

I claim:

1. An air-leak indicator for use in cooperation with a tire air valve of a tire comprising;
   a tubular body having a transparent mid-section;
   fastening means at a lower end of said tubular body for engaging, a tire valve stem;
   a horizontal annular partition with holes there through, fixed in said tubular body above said fastening means;
   a tire valve actuator projection mounted at the center of said annular partition and projection downward, coaxially with said fastening means;
   a tubular indicator piston having bands of different fluorescent colors around an outer periphery of said tubular indicator piston, each color band representing a predetermined pressure range;
   said tubular indicator piston having a closed bottom and being slidably contained within said tubular body above the annular partition;
   said tubular indicator piston having seal means along the outer periphery thereof to provide airtight cooperation between said tubular indicator piston and an inner periphery of said tubular body;
   an end cap threaded to an upper end of said tubular body;
   said end cap having a hole communicating with an interior of said tubular body;
   a return spring mounted between an under side of said end cap and said closed bottom of said tubular indicator piston;
   wherein, air pressure from the tire is released to act upon the closed bottom of said tubular indicator piston against the bias of the return spring when said fastening means engages the tire valve stem and said actuator projection opens the tire air valve and actuates said tubular indicator piston, said transparent mid-section permitting a viewer to observe the tubular indicator piston and determine the relative air pressure of the tire.

* * * * *